(12) United States Patent
Yamazaki et al.

(10) Patent No.: US 11,639,194 B2
(45) Date of Patent: May 2, 2023

(54) VEHICLE CONTROL SYSTEM

(71) Applicant: HONDA MOTOR CO., LTD., Tokyo (JP)

(72) Inventors: Ryo Yamazaki, Wako (JP); Takashi Yanagi, Wako (JP); Takeyuki Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 496 days.

(21) Appl. No.: 16/802,470

(22) Filed: Feb. 26, 2020

(65) Prior Publication Data

US 2020/0269918 A1 Aug. 27, 2020

(30) Foreign Application Priority Data

Feb. 27, 2019 (JP) ............................. JP2019-034090

(51) Int. Cl.
*B62D 15/02* (2006.01)
*G01D 5/24* (2006.01)
*B62D 1/04* (2006.01)

(52) U.S. Cl.
CPC ............ *B62D 15/025* (2013.01); *B62D 1/04* (2013.01); *B62D 15/021* (2013.01); *G01D 5/24* (2013.01)

(58) Field of Classification Search
CPC .................................................. B62D 15/021
See application file for complete search history.

(56) References Cited

U.S. PATENT DOCUMENTS

| | | |
|---|---|---|
| 8,994,665 B1 | 3/2015 | Provancher |
| 9,934,440 B1* | 4/2018 | Kim ...................... G06V 20/56 |
| 2014/0156107 A1 | 6/2014 | Karasawa et al. |
| | (Continued) | |

FOREIGN PATENT DOCUMENTS

| | | |
|---|---|---|
| CN | 104276201 A | 1/2015 |
| CN | 108068828 A | 5/2018 |
| | (Continued) | |

OTHER PUBLICATIONS

Notice of Reasons for Refusal for Patent Application JP 2019-034090 dated Apr. 5, 2022; 6 pp.

(Continued)

*Primary Examiner* — Jean Paul Cass
(74) *Attorney, Agent, or Firm* — Armstrong Teasdale LLP

(57) ABSTRACT

A vehicle control system includes a steering input member rotatably supported by a vehicle body of a vehicle, a primary capacitive sensor provided along an outer edge of a steering input member and configured to detect a position on the steering input member at which a contact is made by a vehicle operator, a rotational angle sensor configured to detect a rotational angle of the steering input member, and a control unit configured to control a steering unit of the vehicle according to a signal from the rotational angle sensor and a signal from the primary capacitive sensor, wherein the control unit is configured to operate in a first operation mode and a second operation mode, the steering unit being controlled according to the signal from the rotational angle sensor in the first operation mode, and according to the signal from the primary capacitive sensor in the second operation mode.

7 Claims, 9 Drawing Sheets

(56) References Cited

U.S. PATENT DOCUMENTS

| | | | |
|---|---|---|---|
| 2014/0365076 A1* | 12/2014 | Cash | B62D 1/02 |
| | | | 701/41 |
| 2015/0307022 A1 | 10/2015 | Nelson | |
| 2015/0369633 A1 | 12/2015 | Karasawa et al. | |
| 2016/0334876 A1 | 11/2016 | Park | |
| 2017/0158055 A1 | 6/2017 | Kim et al. | |
| 2017/0334392 A1 | 11/2017 | Frey et al. | |
| 2018/0136727 A1 | 5/2018 | Chandy | |
| 2018/0304921 A1 | 10/2018 | Hirate et al. | |
| 2018/0312167 A1* | 11/2018 | Kundu | B60W 30/06 |

FOREIGN PATENT DOCUMENTS

| | | | | |
|---|---|---|---|---|
| CN | 108163042 A | * | 6/2018 | B62D 1/183 |
| JP | 2003237610 A | * | 8/2003 | |
| JP | 2003237610 A | | 8/2003 | |
| JP | 2007329832 A | * | 12/2007 | |
| JP | 2008114708 A | * | 5/2008 | |
| JP | 2008114708 A | | 5/2008 | |
| JP | 2017007409 A | | 1/2017 | |
| JP | 2018194916 A | | 12/2018 | |
| WO | 2016203715 A1 | | 12/2016 | |

OTHER PUBLICATIONS

China First Notification of Office Action for Patent Application CN202010118888.4 dated Jan. 10, 2022; 26 pp.

* cited by examiner

VEHICLE CONTROL SYSTEM

TECHNICAL FIELD

The present invention relates to a vehicle control system configured to accept a control input from a steering input member.

BACKGROUND ART

In a known a vehicle control system, a piezoelectric element is provided in an outer ring of a steering wheel to control the acceleration/deceleration and the steering of a vehicle according to a pressure applied by a vehicle operator to the outer ring. See JP2018-194916A, for example.

According to this prior art, since the pressure that the vehicle operator can apply to the outer ring varies depending on the vehicle operator's physique, age, and the like so that the vehicle control system may not be able to accurately interpret the pressure input applied to the outer ring by the vehicle operator.

SUMMARY OF THE INVENTION

In view of such a problem of the prior art, a primary object of the present invention is to provide a vehicle control system which accepts a control input as a touch operation or a pressing operation, and can correctly interpret the control input without regard to personal differences.

To achieve such an object, one embodiment of the present invention provides a vehicle control system (1), comprising: a steering input member (10) rotatably supported by a vehicle body (15) of a vehicle; a primary capacitive sensor (37) provided along an outer edge of the steering input member and configured to detect a position on the steering input member at which a contact is made by a vehicle operator; a rotational angle sensor (38) configured to detect a rotational angle of the steering input member; and a control unit (11) configured to control a steering unit (4) of the vehicle according to a signal from the rotational angle sensor and a signal from the primary capacitive sensor; wherein the control unit is configured to operate in a first operation mode and a second operation mode, the steering unit being controlled according to the signal from the rotational angle sensor in the first operation mode, and according to the signal from the primary capacitive sensor in the second operation mode.

Since a touch operation is not likely to vary from one user to another, the control input consisting of a touch operation or a pressing operation is prevented from varying from one user to another so that the control unit can correctly interpret the control input without regard to personal differences. Thus, the vehicle operator can control the steering unit by turning the steering input unit in the first operation mode which is typically invoked in the manual driving mode, and by touching the capacitive sensor in a prescribed manner in the second operation mode which is typically invoked in the autonomous driving mode.

Preferably, in the second operation mode, the control unit is configured to detect a movement of a contact point on the primary capacitive sensor in a first direction along the outer edge of the steering input member, and a movement of the contact point on the primary capacitive sensor in a second direction opposite from the first direction along the outer edge of the steering input member, and to control the steering unit in dependence on the direction of the movement of the contact point on the primary capacitive sensor.

Thereby, the vehicle operator is able to control the steering unit in either direction simply by rubbing the outer edge of the steering input member in the corresponding direction or either in clockwise direction or in counterclockwise direction. Again, the rubbing operation is not likely to vary depending on personal differences.

The vehicle control system may further comprise an external environment recognition unit (46) configured to acquire environment information of an environment surrounding the vehicle and to output the environment information to the control unit, wherein the control unit is configured to change a control mode of the steering unit in the second operation mode according to the acquired environment information.

The vehicle operator is able to cause the vehicle to behave as desired by the vehicle operator depending on the surrounding environment simply by rubbing the steering input member in the corresponding direction. For instance, the vehicle may be directed to a store or directed to a desired direction on the branch road depending on the existing situation or environment simply by rubbing the steering input member in the corresponding direction.

Preferably, in the second operation mode, the control unit is configured to detect the direction of the movement of the contact point on the primary capacitive sensor according to the signal from the primary capacitive sensor, and to start controlling the steering unit upon elapsing of a prescribed time period after the contact on the primary capacitive sensor has ceased.

Since the vehicle is steered only after elapsing of a certain time period after the vehicle operator's operation or command is completed, the vehicle operator is allowed to get prepared for the change in the behavior of the vehicle so that the operating comfort of the vehicle can be improved.

The vehicle control system may further comprise a secondary capacitive sensor (35, 36) provided on the steering input member at a position different from the primary capacitive sensor, wherein in the second operation mode, the control unit is configured to control the steering unit according to the signal from the primary capacitive sensor, and to control a drive unit and/or a brake unit for accelerating and/or decelerating the vehicle according to the signal from the secondary capacitive sensor, the control unit prohibiting control of the drive unit and/or the brake unit according to the signal from the secondary capacitive sensor when the signal from the primary capacitive sensor is changing.

Thereby, the vehicle operator can accelerate or decelerate the vehicle simply by a touch operation of the secondary capacitive sensor provided on the steering input member. Since the control of the drive unit and the brake unit according to the signal from the secondary capacitive sensor is prohibited when there is an operation input to the primary capacitive sensor, the vehicle behavior is prevented from becoming unstable. Further, even when the vehicle operator accidentally operates the secondary capacitive sensor when operating the primary capacitive sensor, the vehicle is prevented from accelerating or decelerating.

Preferably, the primary capacitive sensor is arranged circumferentially along an outer peripheral portion (33C) of the steering input member, and the secondary capacitive sensor is provided on a front portion (33A) or a back portion (33B) of the steering input member.

Thereby, when the vehicle operator is operating one of the primary capacitive sensor and the secondary capacitive sensor, the vehicle operator can be prevented from contacting the other of the primary capacitive sensor and the secondary capacitive sensor.

The vehicle control system may further comprise a rotation restricting device configured to selectively restrict a rotation of the steering input member relative to the vehicle body, wherein the control unit is configured to activate the rotation restricting device to restrict the rotation of the steering input member relative to the vehicle body in the second operation mode.

Thereby, the steering input member is prevented from rotating when a touch operation is being performed on the steering input member, and the detection of the touch operation can be made in an accurate and reliable manner.

Preferably, the control unit is configured to control the steering unit according to the signals from the primary capacitive sensor and the rotational angle sensor in the second operation mode, and wherein a steering output of the steering unit for a given rotational angle input from the steering input member measured by the rotational angle sensor is smaller in the second operation mode than in the first operation mode.

Thereby, even when the steering input member is turned by the rubbing operation by the vehicle operator, since the control amount of the steering unit with respect to the change amount of the rotational angle of the steering input member is limited, the turning characteristics of the vehicle is prevented from being adversely affected by the rubbing operation.

Thus, the present invention provides a vehicle control system which accepts a control input as a touch operation or a pressing operation, and can correctly interpret the control input without regard to personal differences.

BRIEF DESCRIPTION OF THE DRAWING(S)

DESCRIPTION OF THE PREFERRED EMBODIMENT(S)

Figure 1:
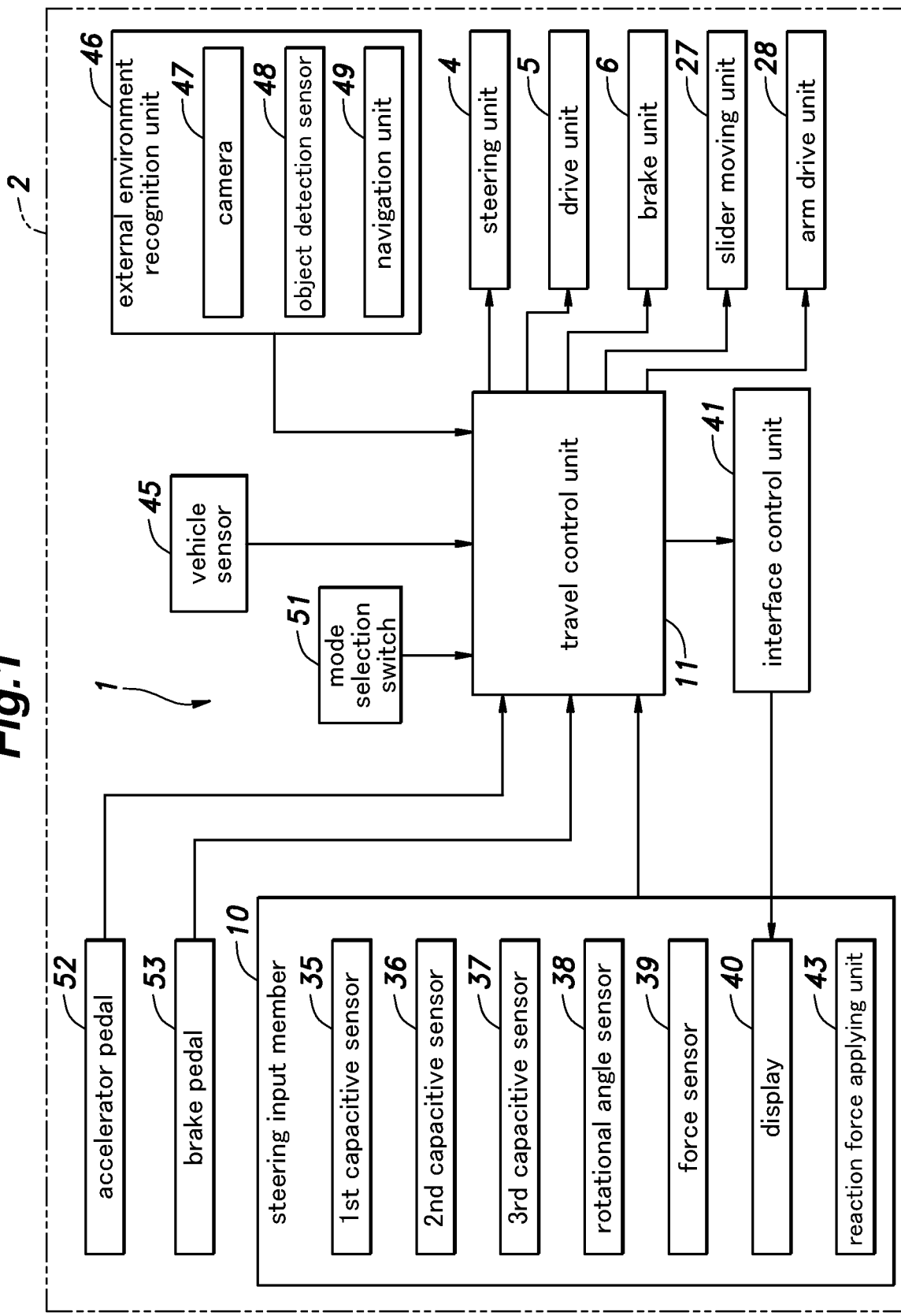
FIG. 1 is a block diagram of a vehicle control system according an embodiment of the present invention.

A vehicle control system 1 according to a preferred embodiment of the present invention is described in the following with reference to the appended drawings. As shown in FIG. 1, the vehicle control system 1 is provided in a vehicle 2 which is capable of autonomous driving. The vehicle 2 can travel either in a manual driving mode in which a vehicle operator mainly performs the driving operation or in an autonomous driving mode in which the control system of the vehicle 2 mainly performs the driving operation. As shown in FIG. 1, the vehicle 2 includes a steering unit 4 that steers the wheels of the vehicle 2, a drive unit 5 that drives the wheels, and a brake unit 6 that applies brake to the wheels.

The steering unit 4 is configured to change the steering angle of the front wheels, and includes an electric motor and a steering mechanism that steers the wheels by using the drive force of an electric motor. The steering mechanism includes, for example, a rack and pinion mechanism. The drive unit 5 is a device for rotating the wheels, and includes at least one of an electric motor and an internal combustion engine, and a transmission mechanism that transmits the drive force of the electric motor and/or the internal combustion engine to the wheels. The drive unit 5 can apply a braking force to the wheels by engine braking when the internal combustion engine is used or by regenerative braking when the drive unit 5 includes an electric motor. The brake unit 6 is a device that applies resistance to the rotation of the wheels to decelerate the vehicle or to bring the vehicle to a stop. In this embodiment, the brake unit 6 consists of a friction brake unit that includes an electric motor, a hydraulic pump that can be driven by the electric motor to generate hydraulic pressure, and a brake caliper that presses a brake pad against a brake disk by receiving the hydraulic pressure from the hydraulic pump.

The vehicle control system 1 includes a steering input member 10 fitted with various sensors, and a travel control unit 11 that controls at least one of the steering unit 4, the drive unit 5, and the brake unit 6 according to a signal or signals from the sensors associated with the steering input member 10. The steering input member 10 is configured to receive a steering input from a vehicle operator in order to steer the vehicle 2. The steering input member 10 may include, for example, a steering wheel or a control stick, and may have an outer edge which is circular or rectangular in shape. The outer edge may also have a more complex shape such as one of two pieces obtained by bisecting a circle by a secant line, a track shape, and so on.

Figure 2:
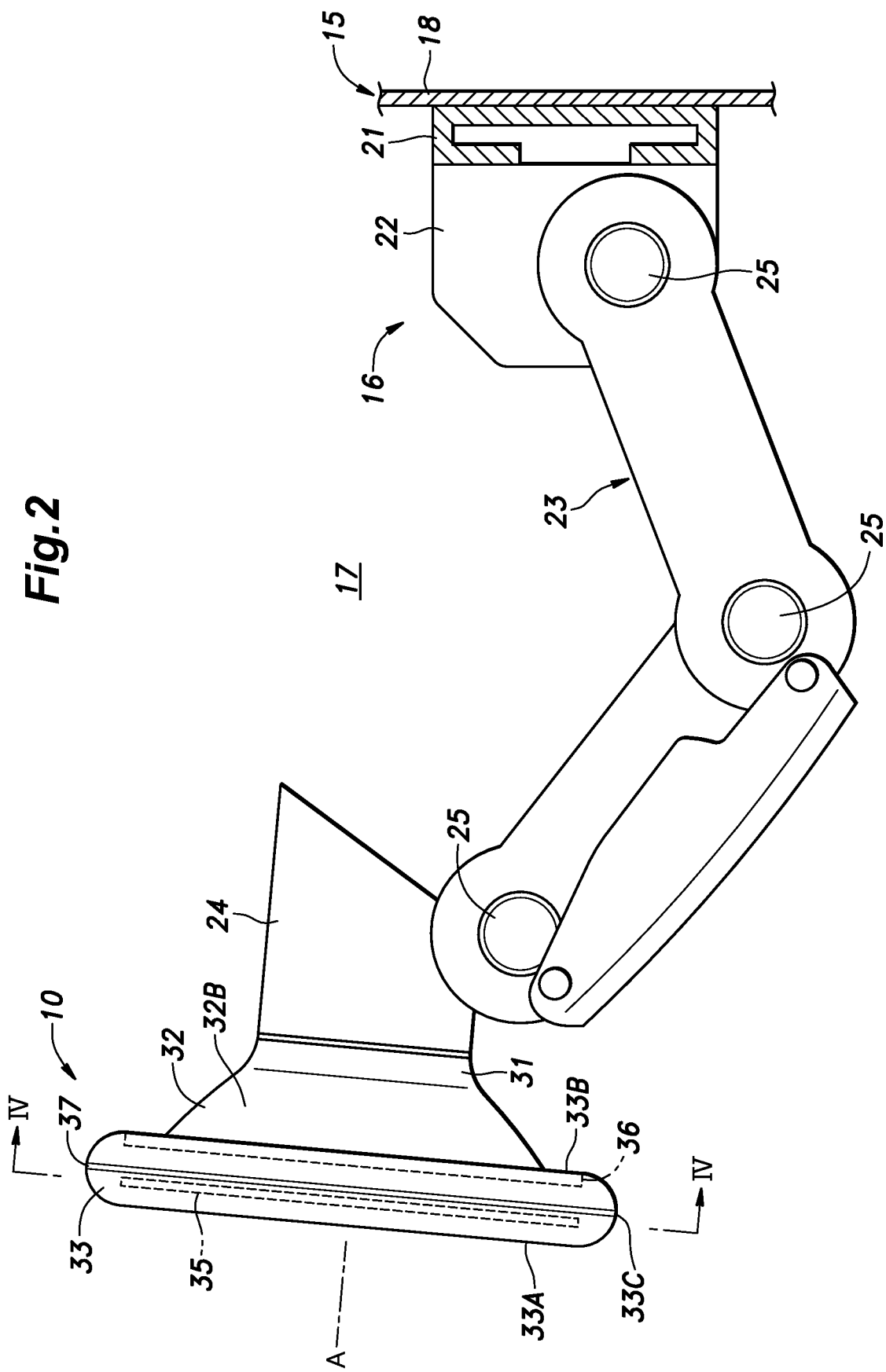
FIG. 2 is a side view of a steering input member of the vehicle control system.

As shown in FIG. 2, the steering input member 10 is rotatably supported by a vehicle body 15 via a support device 16. The support device 16 forms a part of the vehicle body 15. The support device 16 includes a laterally extending rail 21 provided on a dash panel 18 forming a front wall of a cabin 17 of the vehicle 2, a slider 22 slidably supported by the rail 21, an arm 23 extending rearward (or toward the vehicle operator) from the slider 22, and a base 24 provided at a free end or a rear end of the arm 23. The arm 23 has at least one pivot joint 25, and supports the base 24 so as to be movable in the fore and aft direction and the vertical direction with respect to the slider 22. The arm 23 may include one or more parallel link mechanisms. One of the rail 21 and the slider 22 may be provided with a slider moving unit 27 that moves the slider 22 with respect to the rail 21 by using an electric motor. The arm 23 may be provided with an arm driving unit 28 that can flex the arm 23 so as to move the base 24 in the vertical direction and in the fore and aft direction, and to change the tilt angle of the base 24 by using an electric motor.

Figure 3:
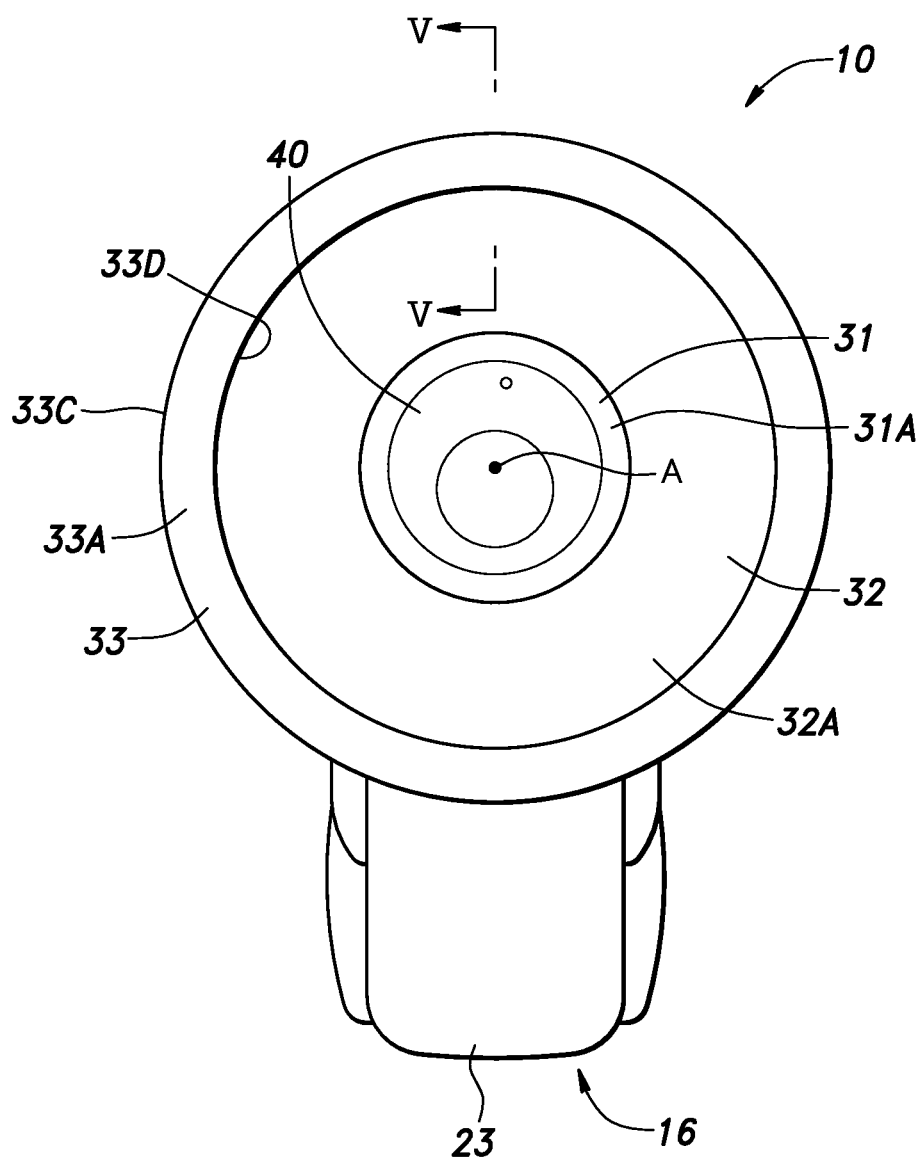
FIG. 3 is a front view of the steering input member.

As shown in FIGS. 2 and 3, the steering input member 10 includes a hub 31 having a cylindrical shape and rotatably provided on the base 24 of the arm 23 around a rotational center line A (which coincides with the central axial line of the cylindrical shape), and a disk 32 extending radially outward from the outer periphery of the hub 31. An outer ring 33 is provided on the outer edge or the outer periphery of the disk 32 in a coaxial relationship to the hub 31. In the present embodiment, the disk 32 is formed as a shallow cone such that the radially outer part of the disk 32 is further away from the base 24 than the radially inner part thereof. The outer ring 33 is formed in an annular shape around the rotational center line A of the steering input member 10 (or the hub 31), and has a circular cross section. The cross sectional diameter of the outer ring 33 is larger than the thickness of the disk 32. The outer ring 33 functions as a grip portion that is gripped by a vehicle operator in order to rotate the steering input member 10 around the rotational center line A.

As shown in FIG. 1, the steering input member 10 is provided with a first capacitive sensor 35, a second capacitive sensor 36, a third capacitive sensor 37, a rotational angle sensor 38, and a force sensor 39. The rotational angle sensor 38 detects a rotational angle of the steering input member 10 with respect to the vehicle body 15. The rotational angle sensor 38 may be a rotary encoder, a resolver, or the like. In another embodiment, a gyro sensor is provided on the steering input member 10. The gyro sensor detects the rotation speed of the steering input member 10.

The force sensor 39 may be a per se known piezoelectric sensor or strain gauge sensor, and is provided between the base 24 and the hub 31. The force sensor 39 detects a pushing load and/or a pull load that is applied to the steering input member 10 in a direction (z direction) directed in parallel with the rotational center line A by the vehicle operator. The force sensor 39 may also be a six-axis force sensor which can detect the forces in the z direction, in an x direction which is orthogonal to the z direction and extends laterally, in a y direction which is orthogonal to the y-direction and the z-direction, and torques around the x, y and z directions, respectively.

Figure 4:
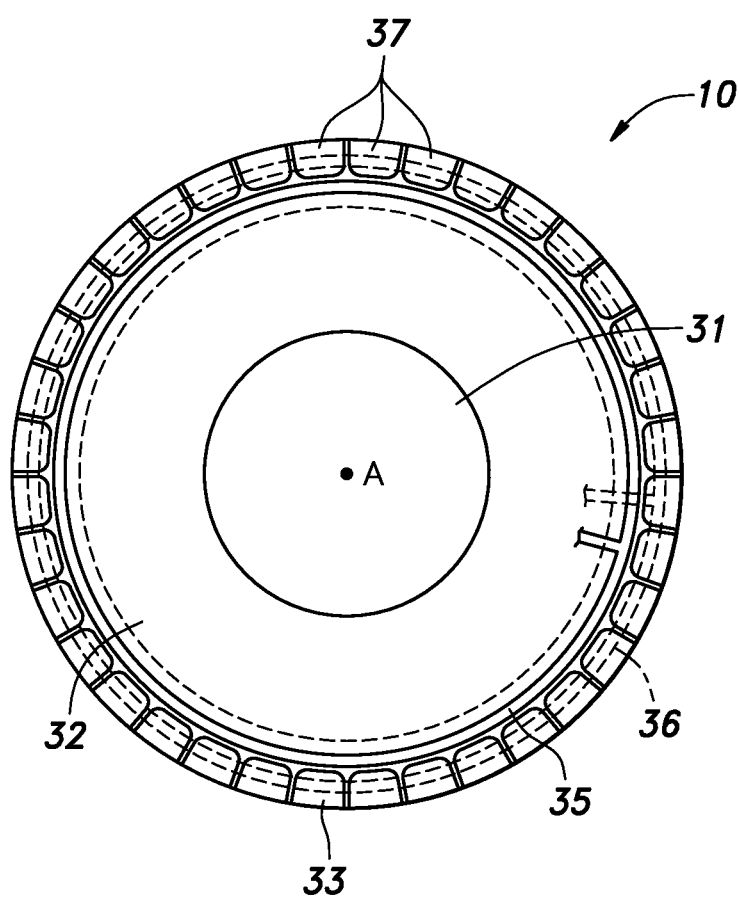
FIG. 4 is a diagram illustrating the positioning of a first to a third capacitive sensor.
Figure 5:
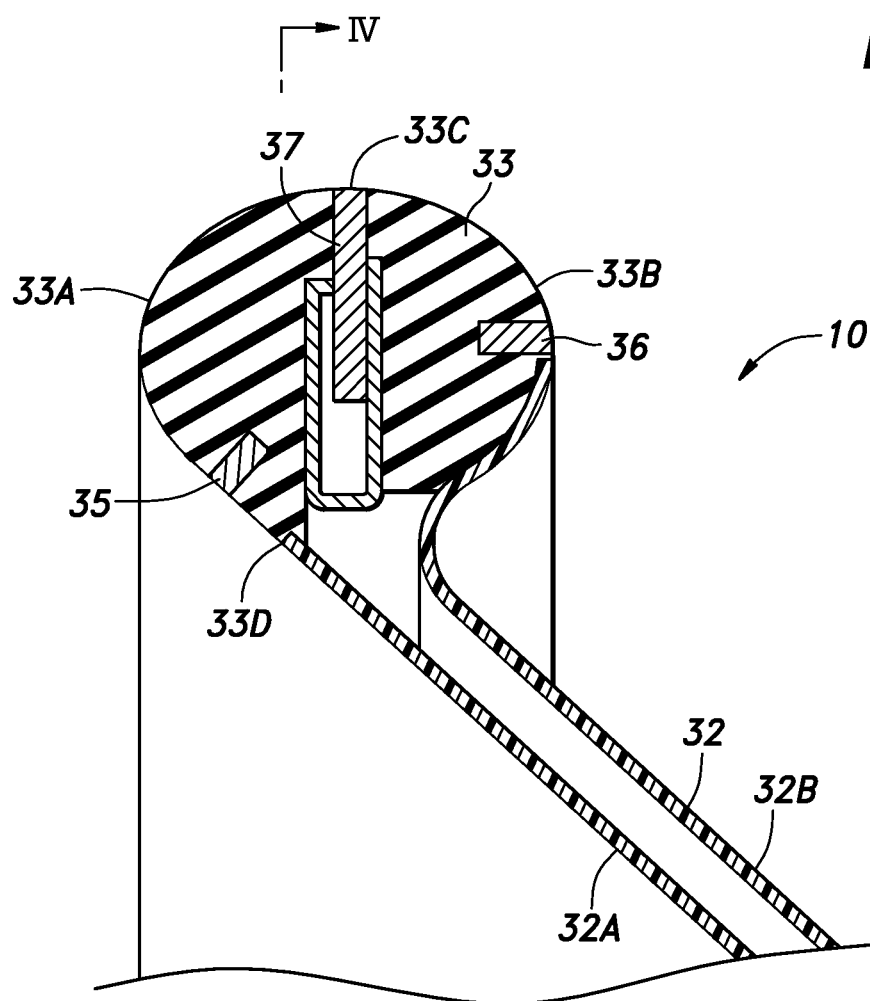
FIG. 5 is a sectional view of an outer ring of the steering input member taken long line V-V in FIG. 3.
Figure 6:
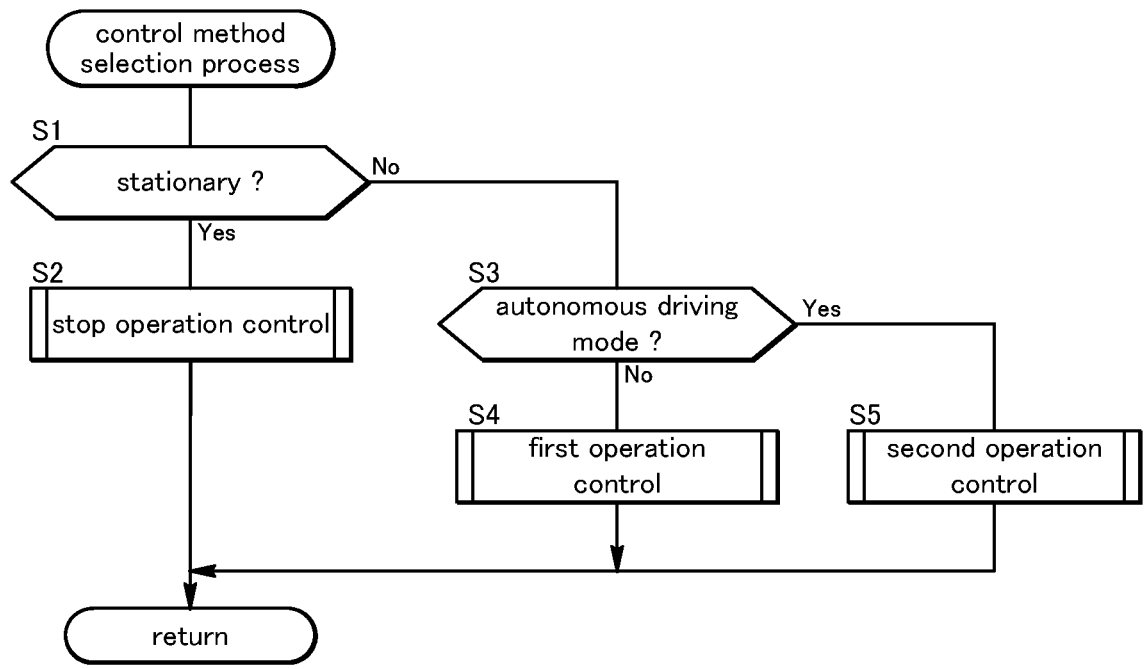
FIG. 6 is a flowchart of a control method selection process executed by a travel control unit of the vehicle control system.

As shown in FIGS. 2, 4, and 5, the first to third capacitive sensors 35 to 37 are used as touch sensors that detect approach and contact of an object such as a vehicle operator's finger according to a change in capacitance. The first to third capacitive sensors 35 to 37 are provided on the outer ring 33 of the steering input member 10.

The outer ring 33 has a front portion 33A (or a front surface portion) facing the vehicle operator and a back portion 33B (or a back surface portion) opposite to the front portion 33A. More specifically, when the outer ring 33 is cut into two parts about a plane containing the outer peripheral edge of the outer ring 33 (the portion where the diameter of the outer ring 33 is the largest around the rotational center line A of the steering input member 10) and the inner peripheral edge of the outer ring 33 (the portion where the diameter of the outer ring 33 is the smallest around the rotational center line A of the steering input member 10), the part near the base 24 (or facing away from the vehicle operator) is defined as the back portion 33B and the part remote from the base 24 (or facing the vehicle operator) is defined as the front portion 33A.

The first capacitive sensor 35 is provided on a first surface of the steering input member 10 which may be one of the front surface and the back surface of the steering input member 10, and the second capacitive sensor 36 is provided on a second surface of the steering input member 10 which may be the other of the front surface and the back surface of the steering input member 10. The front surface includes the front portion 33A of the hub 31, the front portion 32A of the disk 32, and the front portion 33A of the outer ring 33, and the back surface includes the back portion 33B of the hub 31, the back portion 32B of the disk 32, and the back portion 33B of the outer ring 33.

The first capacitive sensor 35 is provided on one of the front portion 33A and the back portion 33B of the outer ring 33, and the second capacitive sensor 36 is provided on the other of the front portion 33A and the back portion 33B of the outer ring 33. In the illustrated embodiment, the first capacitive sensor 35 is provided on the front portion 33A of the outer ring 33, and the second capacitive sensor 36 is provided on the back portion 33B of the outer ring 33.

The first capacitive sensor 35 is provided with a single sensor element formed in an annular shape along the front portion 33A of the outer ring 33 in a coaxial manner. Alternatively, the first capacitive sensor 35 consists of multiple sensor elements arranged in an annular pattern along the front portion 33A of the outer ring 33 in a coaxial manner. The first capacitive sensor 35 is preferably positioned on an inner peripheral part of the front portion 33A. More specifically, when viewed along the direction of the rotational center line A of the steering input member 10, the first capacitive sensor 35 is preferably positioned on the radially inner side of a circle that passes through the widthwise central part of the outer ring 33, or on the inner peripheral part 33D of the outer ring 33.

The second capacitive sensor 36 is provided with a single sensor element formed in a ring shape coaxial with the outer ring 33 along the back portion 33B of the outer ring 33. Alternatively, the second capacitive sensor 36 consists of multiple sensor elements arranged in the circumferential direction along the back portion 33B of the ring 33. The second capacitive sensor 36 preferably extends along the widthwise central part of the back portion 33B of the outer ring 33. The second capacitive sensor 36 thus has a larger diameter than the first capacitive sensor 35.

The third capacitive sensor 37 is provided along the outer edge of the steering input member 10, and is configured not only to detect a contact (a touch) but also to identify a contact position at which the contact is made (a position of a touch operation by a vehicle operator). The third capacitive sensor 37 may be a single sensor extending along the outer edge of the steering input member 10 or a plurality of individual sensor elements arranged along the outer edge of the steering input member 10. In the present embodiment, the third capacitive sensor 37 consists of a plurality of individual and discrete capacitive sensor elements that are arranged in the circumferential direction along an outer peripheral portion 33C of the outer ring 33 (including the outer peripheral edge thereof). An outer peripheral portion 33C of the outer ring 33 constitutes an outer peripheral portion or the outer edge of the steering input member 10. Each of the individual capacitive sensor elements of the third capacitive sensor 37 has the same angular range in the circumferential direction, and is arranged adjacent to each other at equal intervals. It is preferable that the gap between the adjacent capacitive sensor elements is as small as possible. In the present embodiment, the third capacitive sensor 37 includes 36 capacitive sensor elements, each having an angular range of about 10 degrees.

The first to third capacitive sensors 35 to 37 output signals corresponding to the respective capacitances thereof. The capacitances of the first to third capacitive sensors 35 to 37 increase as an object such as a vehicle operator's hand comes closer, as the size of the approaching object increases, and as the relative permittivity of the approaching object increases.

As shown in FIG. 2, a display 40 is provided on the front portion 31A (facing the vehicle operator) of the hub 31. The display 40 is formed in a circular shape and occupies 50% or more of the area of the front surface of the hub 31. As shown in FIG. 1, the display 40 is controlled by an interface control unit 41, and displays images and/or graphics indicating the driving mode (autonomous driving or manual driving) of the vehicle 2, the traveling direction (future trajectory) of the vehicle 2, the positions of other vehicles traveling around the own vehicle 2, and the speed of the own vehicle 2 which are received from the travel control unit 11. The images or the graphics that are displayed may include numerical values and symbols.

A reaction force applying unit 43 is provided between the vehicle body 15 and the hub 31 for applying a reaction force (rotational resistance) to the turning operation of the hub 31 with respect to the vehicle body 15. The reaction force applying unit 43 is, for example, an electric motor, and applies the output torque of the electric motor to the hub 31 as a reaction force to the turning operation of the hub 31. The reaction force applying unit 43 can restrict or prevent the rotation of the hub 31 by applying a sufficient rotational resistance to the hub 31. In other words, the reaction force applying unit 43 may function as a rotation restricting unit that prevents or prohibits the rotation of the steering input member 10 with respect to the vehicle body 15.

The travel control unit 11 is connected to a vehicle sensor 45 that detects various state variables (state quantities) of the vehicle 2, and an external environment recognition unit 46 that detects environmental information around the own vehicle 2. The vehicle sensor 45 includes, for example, a vehicle speed sensor that detects the traveling speed of the vehicle 2, an acceleration sensor that detects the acceleration of the vehicle 2, a yaw rate sensor that detects the yaw rate of the vehicle 2, and the like. The travel control unit 11 acquires various state variables of the vehicle 2 from the vehicle sensor 45.

The external environment recognition unit 46 acquires the surrounding vehicle information and the surrounding environment information, and outputs the acquired information to the travel control unit 11. The external environment recognition unit 46 includes a camera 47 that captures an image around the own vehicle 2, an object detection sensor 48 such as a laser or a lidar that detects objects existing around the own vehicle 2, and a navigation unit 49. The external environment recognition unit 46 detects and identifies road lane markings and shoulder markings from the image captured by the camera 47, and detects the surrounding vehicles traveling around the own vehicle 2 according to the image captured by the camera 47 and the detection signal of the object detection sensor 48. In addition, the external environment recognition unit 46 acquires the surrounding environment information including the position and speed of the own vehicle 2, and stores (shops, restaurants, and other goods and service providing establishments) and branch roads (junctions and forks) located around the own vehicle according to the own vehicle position, the map information and the POI (point of interest) obtained from the navigation unit 49.

The travel control unit 11 can be selectively operated either in the manual driving mode or the autonomous driving mode. The travel control unit 11 can be switched between the manual driving mode and the automatic driving mode by manually operating a mode selection switch 51, for example. In the manual driving mode, the travel control unit 11 controls the drive unit 5, the brake unit 6, and the steering unit 4 according to the depression of the accelerator pedal 52 and the brake pedal 53 by the vehicle operator, and the turning operation of the steering input member 10 with respect to the base 24 by the vehicle operator. The accelerator pedal 52 and the brake pedal 53 are each provided with a position sensor that outputs a signal corresponding to the depressed position of the accelerator pedal 52 and the brake pedal 53 to the travel control unit 11. In the autonomous driving mode, the travel control unit 11 generates a future trajectory of the vehicle 2, and controls the drive unit 5, the brake unit 6, and the steering unit 4 without requiring the operation by the vehicle operator.

The travel control unit 11 is configured to execute a first operation mode in which the steering unit 4 is controlled according a signal from the rotational angle sensor 38 for detecting a rotational angle of the steering input member 10, and a second operation mode in which the steering unit 4 is controlled according to a signal from at least one of the first to third capacitive sensors 35 to 37. The travel control unit 11 may select between the first operation mode and the second operation mode according to the driving mode of the vehicle 2. The travel control unit 11 may execute the first operation mode when in the manual driving mode, and may execute the second operation mode when in the autonomous driving mode.

In the first operation mode, the travel control unit 11 controls the steering unit 4 according to the turning operation of the steering input member 10 by the vehicle operator, and changes the steering angle of the wheels accordingly. In the second operation mode, the travel control unit 11 controls at least one of the steering unit 4 and the drive unit 5 according to the vehicle operator's touch operation on any of the first to third capacitive sensors 35 to 37.

The first capacitive sensor 35 and the second capacitive sensor 36 output a signal corresponding to the capacitances thereof to the travel control unit 11. The travel control unit 11 controls at least one of the drive unit 5 and the brake unit 6 according to the signals output from the first capacitive sensor 35 and the second capacitive sensor 36. For example, in the second operation mode corresponding to the autonomous driving mode, the travel control unit 11 controls the drive unit 5 and the brake unit 6 according to the signals output from the first capacitive sensor 35 and the second capacitive sensor 36. In the present embodiment, the travel control unit 11 executes an acceleration control for controlling the drive unit 5 to accelerate the vehicle 2 when a predetermined signal from the first capacitive sensor 35 is received, and executes a deceleration control for controlling at least one of the drive unit 5 and the brake unit 6 so as to decelerate the vehicle 2 when a predetermined signal is received from the second capacitive sensor 36. The acceleration control may include increasing the vehicle speed from the current speed by a prescribed value, and decreasing the target distance to the preceding vehicle from the current distance by a prescribed value. The deceleration control may include decreasing the vehicle speed from the current speed by a prescribed value, and increasing the target distance to the preceding vehicle from the current distance by a prescribed value.

When the vehicle operator performs a predetermined operation on the first capacitive sensor 35, the first capacitive sensor 35 outputs a predetermined signal to the travel control unit 11. The predetermined operation performed by the vehicle operator on the first capacitive sensor 35 may be, for example, an operation that generates a predetermined change in capacitance, such as a single tap operation, a double tap operation, or a long press operation. In the present embodiment, the travel control unit 11 executes an acceleration control upon detecting a change in the capacitance of the first capacitive sensor 35 corresponding to a single tap operation on the first capacitive sensor 35 by the vehicle operator.

In addition, the travel control unit 11 performs an acceleration control when the capacitance of the first capacitive sensor 35 becomes equal to or more than the first determination value in response to the vehicle operator's predetermined operation on the first capacitive sensor 35. The travel control unit 11 may perform the acceleration control upon elapsing of a certain time period after the occurrence of an event where the capacitance of the first capacitive sensor 35 persisted or continued to be equal to or greater than the first determination value for a predetermined time period, and thereafter, the capacitance of the first capacitive sensor 35 fell below the first determination value. By following this procedure, an excessive detection by the first capacitive sensor 35 can be avoided.

The travel control unit 11 may execute the acceleration control according to the detection value of the third capacitive sensor 37 in addition to the detection value of the first capacitive sensor 35. For example, the travel control unit 11 may execute the acceleration control when a change in the capacitance of the first capacitive sensor 35 corresponding to a single tap operation on the first capacitive sensor 35 by the vehicle operator is detected, and a change in any part of the third capacitive sensor 37 corresponding to a long press operation by the vehicle operator is detected. The travel control unit 11 may also execute the acceleration control when a change in the capacitance of the first capacitive sensor 35 corresponding to a single tap operation on the first capacitive sensor 35 by the vehicle operator is detected, and a change in a prescribed part of the third capacitive sensor 37 corresponding to a long press operation by the vehicle operator is detected. According to this arrangement, the travel control unit 11 accelerates the vehicle 2 when the vehicle operator has performed a single tap operation with the thumb on the front portion 33A of the outer ring 33 while the palm of the hand is placed at a specific position along the outer periphery of the outer ring 33. It is also possible to provide a plurality of sensor elements of the first capacitive sensor 35 along the periphery of the steering input member 10, and cause the travel control unit 11 to execute the acceleration control when a signal corresponding to a capacitance equal to or greater than a prescribed value is received from a prescribed part or a prescribed sensor element of the first capacitive sensor 35.

The travel control unit 11 may also execute the acceleration control according to the detection value of the force sensor 39 in addition to the detection value of the first capacitive sensor 35. For example, the travel control unit 11 may execute the acceleration control upon detecting a change in the capacitance of the first capacitive sensor 35 corresponding to a single tap operation on the first capacitive sensor 35 by the vehicle operator, and a signal corresponding to the pushing of the steering input member 10 toward the base 24 in the direction (first direction) of the rotational center line A of the steering input member 10. According to this procedure, excessive detection of the first capacitive sensor 35 can be avoided. Further, it may be difficult to detect the amount of acceleration desired by the vehicle operator only from the touch operation by the vehicle operator by using the first capacitive sensor 35, but by using the detection result of the force sensor 39 in combination with the detection result of the first capacitive sensor 35, the vehicle operator's desire can be determined in a more accurate and reliable manner. As a result, the level of acceleration desired by the vehicle operator can be transmitted to the travel control unit 11 in a more accurate manner.

When the vehicle operator performs a predetermined operation on the second capacitive sensor 36, the second capacitive sensor 36 outputs a predetermined signal to the travel control unit 11. The predetermined operation performed by the vehicle operator on the second capacitive sensor 36 may be, for example, an operation that generates a predetermined change in capacitance, such as a single tap operation, a double tap operation, or a long press operation. In the present embodiment, the travel control unit 11 executes the deceleration control upon detecting a change in the capacitance of the second capacitive sensor 36 corresponding to a single tap operation on the second capacitive sensor 36 by the vehicle operator.

The travel control unit 11 may execute a deceleration control when the capacitance of the second capacitive sensor 36 becomes equal to or more than a second determination value as a result of a predetermined operation by the vehicle operator on the second capacitive sensor 36. The travel control unit 11 may perform the deceleration control upon elapsing of a certain time period after the occurrence of an event where the capacitance of the second capacitive sensor 36 persisted or continued to be equal to or greater than the second determination value for a predetermined time period, and thereafter, the capacitance of the second capacitive sensor 36 fell below the second determination value. By following this procedure, an excessive detection by the second capacitive sensor 36 can be avoided.

The travel control unit 11 may execute the deceleration control according to the detection value of the third capacitive sensor 37 in addition to the detection value of the second capacitive sensor 36. For example, the travel control unit 11 may execute the deceleration control according to a change in the capacitance of the second capacitive sensor 36 corresponding to the single tap operation on any part of the second capacitive sensor 36 performed by the vehicle operator, and a change in the capacitance of the third capacitive sensor 37 corresponding to a long press operation on the third capacitive sensor by the vehicle operator. Also, the travel control unit 11 may execute the deceleration control according to a change in the capacitance of the second capacitive sensor 36 corresponding to the single tap operation on the second capacitive sensor 36 performed by the vehicle operator, and a change in the capacitance of a prescribed part of the third capacitive sensor 37 corresponding to a long press operation on this part of the third capacitive sensor 37 by the vehicle operator. Thus, in this case, when the vehicle operator performs a single tap operation with the index finger or the middle finger on the back portion of the outer ring 33 while the palm is placed at a specific position along the circumference of the outer ring 33, the travel control unit 11 decelerates the vehicle 2.

The travel control unit 11 may execute the deceleration control according to the detection value of the force sensor 39 in addition to the detection value of the second capacitive sensor 36. For example, the travel control unit 11 may execute the deceleration control when a change in the capacitance of the second capacitive sensor 36 corresponding to a single tap operation on the second capacitive sensor 36 by the vehicle operator is detected, and a load in the direction (second direction) along the rotational center line A of the steering input member 10 pulling the steering input member 10 away from the base 24 is detected by the force sensor 39. Thereby, excessive detection of the second capacitive sensor 36 can be avoided. In this conjunction, the second capacitive sensor 36 may include a plurality of sensor elements along the circumferential direction of the steering input member 10, and the travel control unit 11 may execute the deceleration control when a signal indicating a capacitance equal to or greater than a prescribed value is received from a prescribed part or a prescribed sensor element of the second capacitive sensor 36.

In addition, the travel control unit 11 may be configured to change the control action that is executed in response to the operation by the vehicle operator depending on the state variables of the vehicle 2 such as the vehicle speed. The travel control unit 11 may execute different control actions for the same operation performed on the first to third capacitive sensors 35 to 37 depending on when the vehicle 2 is stationary or in motion, for example. The travel control unit 11 may acquire the vehicle speed from the vehicle sensor 45, and determine that the vehicle 2 is stationary when the vehicle speed is 0 or equal to or less than a predetermined value. The travel control unit 11 may execute a travel start control via the drive unit 5 when, for example, the vehicle speed is equal to or lower than a predetermined value, and a change in capacitance corresponding to a single tap operation is detected at a prescribed position on the third capacitive sensor 35. The travel control unit 11 may execute a stop control to bring the vehicle 2 to a stop when, for example, the vehicle speed is greater than a predetermined value, and a change in capacitance corresponding to a single tap operation is detected at a prescribed position on the third capacitive sensor 35. Further, the travel control unit 11 may activate a parking brake included in the brake unit 6 after the vehicle 2 has come to a stop.

In addition, the travel control unit 11 may detect a movement of an object such as a hand of the vehicle operator sliding over the outer ring 33 either in clockwise direction or counterclockwise direction, and execute a steering control for controlling the steering unit 4 according to the direction of the movement of the object. When the object moves circumferentially along the outer peripheral portion 33C of the outer ring 33, the capacitance of the part of the third capacitive sensor 35 where the contact is made increases, and then the capacitance of the same part of the third capacitive sensor 35 decreases as the contact point moves past this part. By detecting the changes in capacitance in the different parts of the third capacitive sensor 35, the sliding or rubbing movement of the vehicle operator along the outer peripheral portion 33C of the outer ring 33 can be detected.

Thus, the travel control unit 11 is able to detect if the rubbing operation progressed in clockwise direction or counterclockwise direction according to the order in which the change in capacitance from one sensor element to another takes place in the third capacitive sensor 37. In other words, the travel control unit 11 is able to detect if the touching operation progressed in a first direction or a second direction opposite to the first direction along the outer edge of the steering input member 10 (the outer peripheral portion 33C of the outer ring 33). Also, the travel control unit 11 is able to identify the part (region) of the outer ring 33 to which the rubbing operation by the vehicle operator is applied. It is also possible to arrange such that the steering control is executed when the rubbing operation by the vehicle operator is performed on a specific part of the outer ring 33. If the third capacitive sensor 37 is configured to allow the position at which the vehicle operator performed a touch operation to be identified, the travel control unit 11 is able to determine, from the output signal of the third capacitive sensor 37, the position at which the touching operation is performed and the direction of the movement of the position at which the touching operation is performed.

The travel control unit 11 changes the control mode of the steering unit 4 which is invoked in response to the vehicle operator's rubbing operation in the second operation mode depending on the environment information around the vehicle 2 acquired by the external environment recognition unit 46. The travel control unit 11 may detect, for example, the presence or absence of a lane adjacent to the lane in which the vehicle 2 is currently traveling according to the surrounding environment information, and changes the lanes when the adjacent lane exists in the direction corresponding to the direction of the rubbing operation. The travel control unit 11 may detect, for example, the presence or absence of a branch road on the course of the vehicle 2 according to the surrounding environment information. If the branch road exists in a direction corresponding to the direction of the rubbing operation, the steering unit 4 may be controlled to steer in the corresponding direction. The travel control unit 11 may detect, for example, the presence or absence of a store on the course of the own vehicle 2 according to the surrounding environment information. If the store exists in the direction corresponding to the direction of the rubbing operation, the steering unit 4 may be controlled to steer the vehicle 2 toward the store. The travel control unit 11 may detect, for example, the presence or absence of a surrounding vehicle existing around the own vehicle 2 according to the surrounding vehicle information. If the surrounding vehicle exists in the direction corresponding to the direction of the rubbing operation, the steering unit 4 may be controlled so as to appropriately maintain the lateral distance to the surrounding vehicle.

In the second operation mode, the travel control unit 11 may be configured to control the steering unit 4 when the direction of the movement of the object touching the outer ring 33 is detected according to the signal from the sensor elements of the third capacitive sensor 37, and a prescribed time period has elapsed after the object ceased to be touching the outer ring 33. In other words, the travel control unit 11 starts controlling the steering unit 4 when the rubbing operation on the outer ring 33 by the vehicle operator is detected, and in addition, a prescribed time period has elapsed after the hand of the vehicle operator is removed from the outer ring. Thereby, the vehicle operator is given time to get prepared for the change in the behavior of the vehicle so that the operating comfort of the vehicle can be improved.

The travel control unit 11 is prohibited from controlling the drive unit 5 and the brake unit 6 according to the signals from the first capacitive sensor 35 and the second capacitive sensor 36 during the time the signals received from the third capacitive sensor 37 are changing. When a signal from the first capacitive sensor 35 is received, and a signal from the second capacitive sensor 36 is received as well, the travel control unit 11 does not execute the acceleration operation, and executes the deceleration operation. In other words, when the travel control unit 11 has received signals to execute two or more of the steering control, the deceleration control and the acceleration control, a certain arbitration takes place. Typically, only one of the steering control, the deceleration control and the acceleration control having the highest priority is executed. The priority is given to the steering operation, the deceleration control and the acceleration control, in that order. Thereby, even if the vehicle operator accidentally touches the first capacitive sensor 35 or the second capacitive sensor 36 during the rubbing operation, the vehicle 2 is prevented from inadvertently accelerating or decelerating.

The travel control unit 11 controls the reaction force applying unit 43 in the second operation mode to restrict the rotation of the hub 31 of the steering input member 10 with respect to the vehicle body 15. Thereby, the steering input member 10 can be prevented from rotating as a result of the rubbing operation of the outer ring 33 by the vehicle operator so that the travel control unit 11 can correctly detect the vehicle operator's rubbing operation according to the signals from the sensor elements of the third capacitive sensor 37.

According to another embodiment of the present invention, in the second operation mode, the travel control unit 11 controls the steering unit 4 according to the signals from the sensor elements of the third capacitive sensor 37, and also according to the signal from the rotational angle sensor 38. In this case, preferably, the control amount of the steering angle of the wheels for a given change in the angular position of the steering input member 10 in the second operation mode is smaller than the control amount of the steering angle of the wheels for the same change in the angular position of the steering input member 10 in the first operation mode. In this conjunction, the travel control unit 11 may be configured such that the control amount of the steering angle of the wheels for a given change in the angular position of the steering input member 10 in the second operation mode is zero. Thereby, even when the steering input member 10 is turned by the rubbing operation by the vehicle operator on the outer ring 33, since the control amount of the steering angle of the wheels is restricted, the vehicle is prevented from being inadvertently steered.

The control procedure of the vehicle control system 1 according to the preferred embodiment of the present invention is described in the following with reference to the flowcharts of FIGS. 6 to 9. The travel control unit 11 selects a control method for the vehicle 2 in a control method selection process shown in the flowchart of FIG. 6. In the control method selection process, first of all, the travel control unit 11 determines if the vehicle 2 is stationary according to the vehicle speed acquired from the vehicle sensor 45 (S1). The travel control unit 11 may determine that the vehicle 2 is stationary when the vehicle speed is equal to or less than a predetermined determination value. The determination value of the vehicle speed may be 0, for example.

Figure 7:
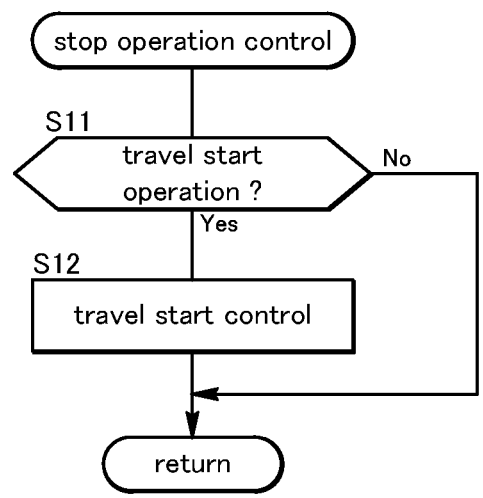
FIG. 7 is a flowchart of a stop operation process executed by the travel control unit of the vehicle control system.

If the vehicle 2 is stationary (or the determination result in S1 is Yes), the travel control unit 11 executes a stop operation control shown the flowchart of FIG. 7 (S2). When the vehicle 2 is not stationary (the determination result in S1 is No), the travel control unit 11 determines if the current driving mode of the vehicle 2 is the autonomous driving mode (S3). When the current driving mode is the autonomous driving mode (the determination result in S3 is Yes), the travel control unit 11 executes a first operation control corresponding to a first operation mode (S5). Conversely, when the current driving mode is not the autonomous driving mode (No in S3), or, in other words, when the current driving mode is the manual driving mode, the travel control unit 11 executes a second operation control corresponding to a second operation mode shown in the flowchart of FIG. 8 (S5). The travel control unit 11 executes one of the stop operation control, the first operation control, and the second operation control selected by the control method selection process.

In the first operation control, the travel control unit 11 controls the steering unit 4 according to the signal from the rotational angle sensor 38, and controls the drive unit 5 and the brake unit 6 according to a push/pull operation of the steering input member 10 and a touch operation on the first to third capacitive sensors 35 to 37. The travel control unit 11 detects a push movement (a movement away from the vehicle operator) of the steering input member 10, and a pull movement (a movement toward the vehicle operator) of the steering input member 10, along the rotational center line A, according to the signal from the force sensor 39, for example. The drive unit 5 and the brake unit 6 are controlled so as to decelerate the vehicle 2 when a pull movement of the steering input member 10 is detected, and so as to accelerate the vehicle 2 when push movement of the steering input member 10 is detected. Thus, the vehicle operator is able to steer the vehicle 2 by turning the steering input member 10, and can accelerate and decelerate the vehicle 2 by pushing and pulling the steering input member 10, respectively. In the first operation control, the travel control unit 11 controls the steering unit 4 according to the signal from the rotational angle sensor 38, controls the drive unit 5 according to the signal from the accelerator pedal 52, and controls the drive unit 5 and the brake unit 6 according to the signal from the brake pedal 53.

In the stop operation control shown in FIG. 7, the travel control unit 11 first determines if a predetermined touch operation by the vehicle operator corresponding to the travel start operation has been detected according to the signals from the first to third capacitive sensors 35 to 37 (S11). The vehicle operator's touch operation corresponding to the travel start operation can be set in a number of different ways. For example, the travel start operation may be invoked by a single tap to a predetermined position in the circumferential direction of the outer peripheral portion 33C (third capacitive sensor 35) of the outer ring 33. When the travel control unit 11 detects the travel start operation performed by the vehicle operator (the determination result in S11 is Yes), the travel control unit 11 executes the travel start control to drive the drive unit 5, and causes the vehicle 2 to start traveling (S12). If the travel control unit 11 does not detect the travel start operation by the vehicle operator (the determination result in S11 is No), the travel control unit 11 repeats the stop operation control.

When the travel control unit 11 is executing the stop operation control, the vehicle operator can start the vehicle 2 by performing a predetermined touch operation on the steering input member 10 when the vehicle 2 is stationary.

Figure 8:
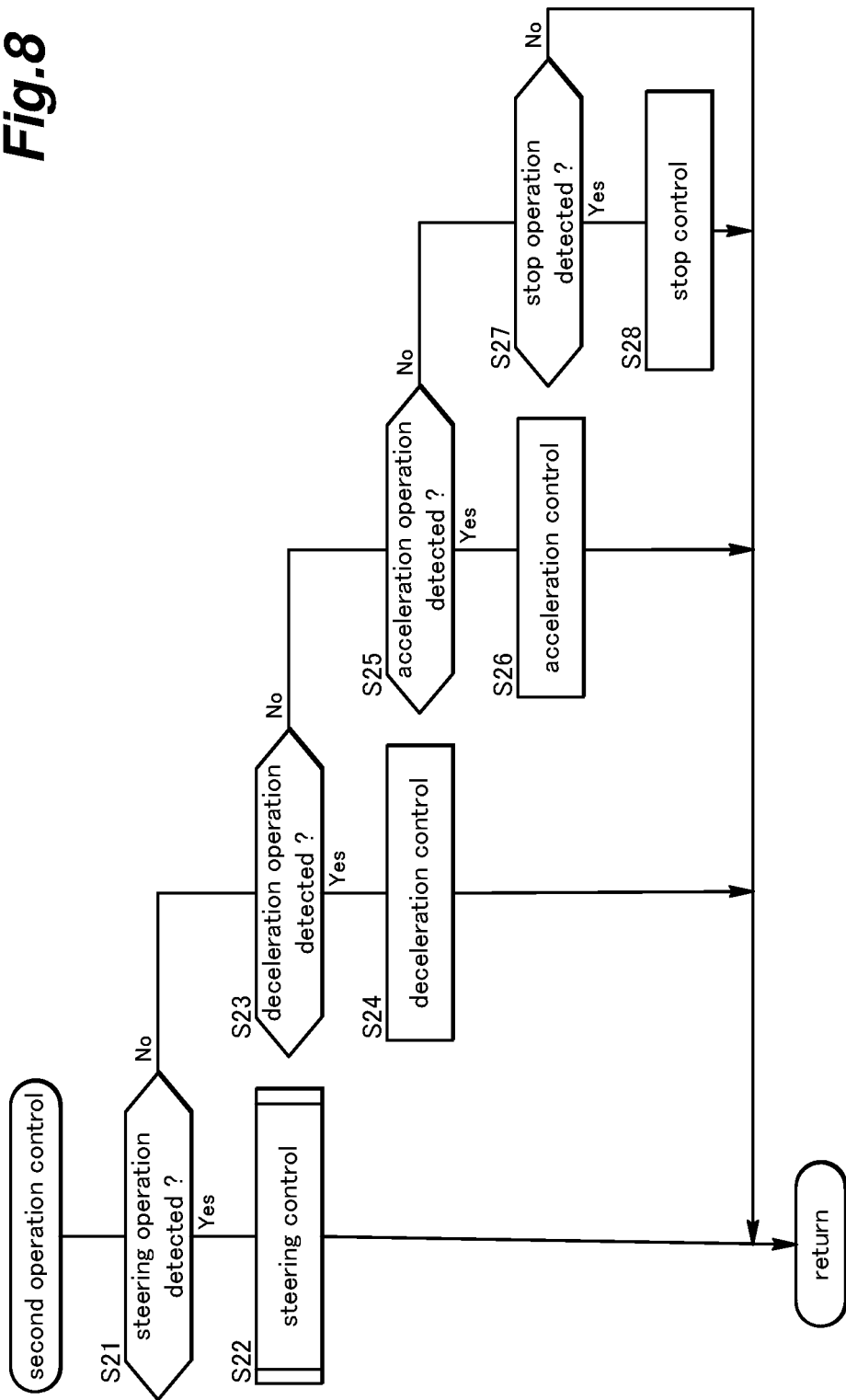
FIG. 8 is a flowchart of a second operation control executed by the travel control unit of the vehicle control system.

In the second operation control shown in FIG. 8, the travel control unit 11 first determines if the vehicle operator's predetermined touch operation corresponding to the steering operation has been detected according to the signal from the third capacitive sensor 37 (S21). The vehicle operator's touch operation corresponding to the steering operation consists of the rubbing operation on the outer peripheral portion 33C (the third capacitive sensor 37) of the outer ring 33. The rubbing operation detected by the travel control unit 11 may be rightward (clockwise) or leftward (counterclockwise). Upon detecting the steering operation by the vehicle operator (Yes in S21), the travel control unit 11 executes the steering control (see FIG. 9) for operating the steering unit 4 (S12) in the corresponding direction.

Figure 9:
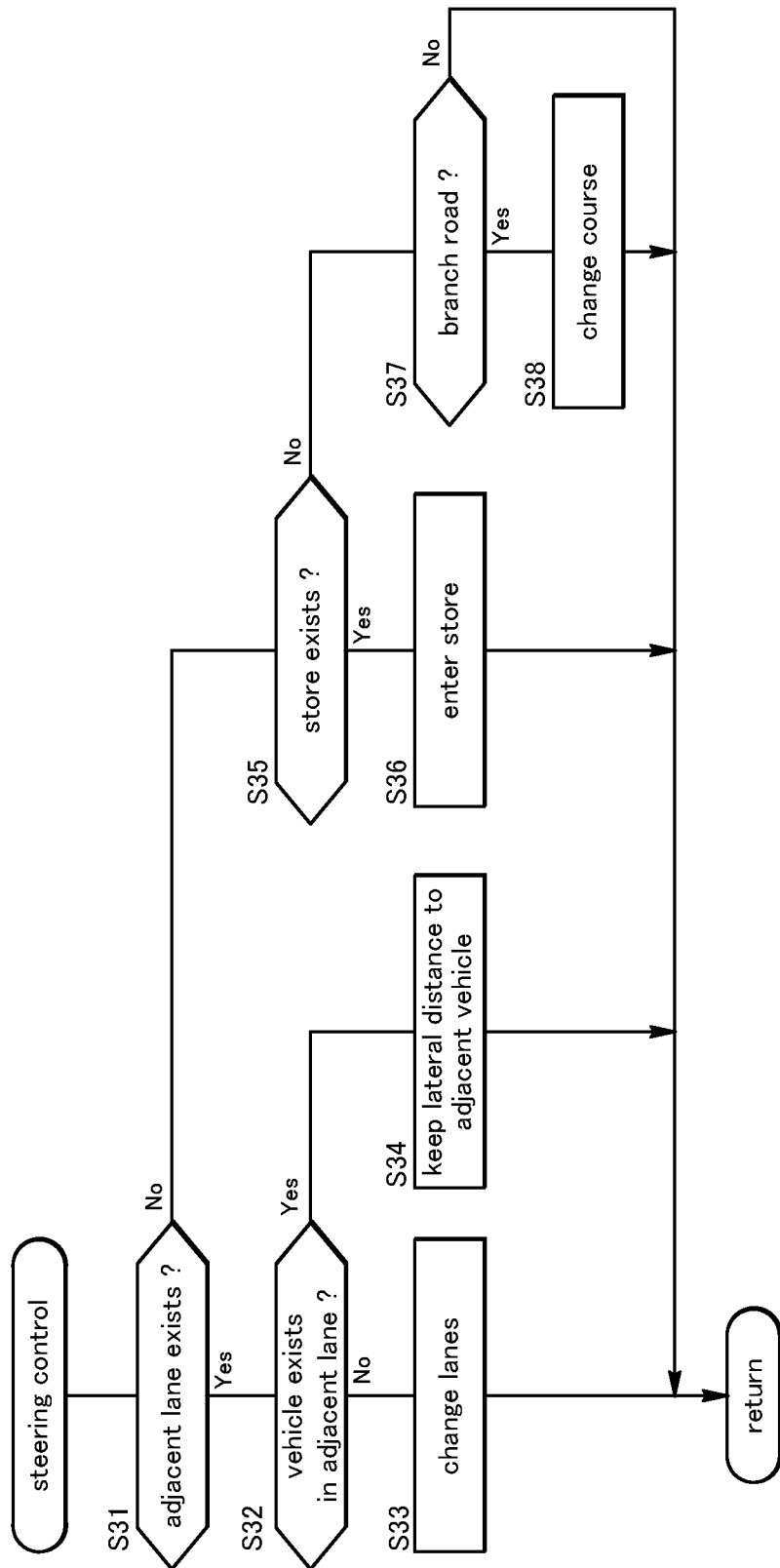
FIG. 9 is a flowchart of a steering control in the second operation control executed by the travel control unit of the vehicle control system.

In the steering control shown in the flowchart of FIG. 9, the travel control unit 11 first determines if there is an adjacent lane in the direction corresponding to the direction of the rubbing operation according to the signal from the third capacitive sensor 37 and the signal from the external environment recognition unit 46 (S31). The travel control unit 11 may determine if there is an adjacent lane according to the image of the view ahead of the vehicle 2 acquired by the camera 47 included in the external environment recognition unit 46, the own vehicle position detected by the navigation unit 49, and the map information corresponding to the own vehicle position.

When it is determined that there is an adjacent lane in the direction corresponding to the direction of the rubbing operation (the determination result in S31 is Yes), the travel control unit 11 determines if there is a vehicle (adjacent vehicle) adjacent to the own vehicle 2 in the adjacent lane (S32). The travel control unit 11 may determine the presence or absence of an adjacent vehicle according to the environment information acquired by the camera 47 and the object detection sensor 48 included in the external environment recognition unit 46. When it is determined that there is no adjacent vehicle in the adjacent lane (the determination result in S32 is Yes), the travel control unit 11 controls the steering unit 4 to change the lane to the adjacent lane (S33). The travel control unit 11 may generate, for example, a future travel trajectory of the vehicle 2 so that the vehicle 2 may travel along the future travel trajectory when changing lanes to the adjacent lane.

When it is determined that there is an adjacent vehicle in the adjacent lane (the determination result in S32 is Yes), the travel control unit 11 controls the steering unit 4 so that the lateral distance to the adjacent vehicle is kept at an appropriate distance (S34).

When the travel control unit 11 determines that there is no adjacent lane in the direction corresponding to the direction of the rubbing operation (the determination result in S31 is No), the travel control unit 11 determines if there is a store on the side corresponding to the direction of the rubbing operation (S35). The travel control unit 11 may determine the presence or absence of a store, for example, according to the environment information such as a POI near the own vehicle position acquired from the navigation unit 49 included in the external environment recognition unit 46.

When it is determined that there is a store on the side corresponding to the direction of the rubbing operation in the traveling direction of the own vehicle 2 (Yes in S35), the travel control unit 11 controls the steering unit 4 to enter the detected store (S36). The travel control unit 11 may generate, for example, a future travel trajectory of the vehicle 2 for the vehicle to enter the detected store, and control the steering unit 4 so that the vehicle 2 travels along the future travel trajectory. Alternatively or additionally to the process of step S36, the travel control unit 11 may notify the presence of the store by displaying it on the display 40 or by speech, or may inquire the user if the vehicle operator desires to enter the store.

When it is determined that there is no store on the side corresponding to the direction of the rubbing operation in the traveling direction of the own vehicle 2 (the determination result in S35 is No), the travel control unit 11 determines if there is a branch road in the direction corresponding to the direction of the rubbing operation according to the signal from the third capacitive sensor 37 and the environment information from the external environment recognition unit 46 (S37). The travel control unit 11 may determine if there is a branch road according to the vehicle position detected by the navigation unit 49 included in the external environment recognition unit 46 and the map information corresponding to the vehicle position.

When the travel control unit 11 determines that there is a branch road on the side corresponding to the direction of the rubbing operation (the determination result in S37 is Yes), the travel control unit 11 controls the steering unit 4 to change the course to the branch road (S38). The travel control unit 11 may generate, for example, a future travel trajectory of the vehicle 2 when changing the course to the branch road, and control the steering unit 4 so that the vehicle 2 travels along the future travel trajectory. When it is determined that there is no branch road in the direction corresponding to the direction of the rubbing operation (the determination result in S37 is No), the travel control unit 11 ends the steering control.

The steering control by the travel control unit 11 allows the vehicle operator to steer the vehicle 2 simply by rubbing the outer peripheral portion 33C of the outer ring 33 of the steering input member 10. The steering operation of the vehicle 2 corresponding to the rubbing operation varies depending on the external environment of the vehicle 2.

In the second operation control, when the vehicle operator's steering operation is not detected in the second operation control (No in S21), the travel control unit 11 determines if a predetermined touch operation by the vehicle operator corresponding to the deceleration operation has been detected according to the signals from the first to third capacitive sensors 35 to 37 (S23). The vehicle operator's touch operation corresponding to the deceleration operation is an operation different from the steering operation, and may be, for example, a single tap operation on the back portion 31B (the second capacitive sensor 36) of the outer ring 33. Upon detecting the deceleration operation by the vehicle operator (Yes in S23), the travel control unit 11 executes the deceleration control for driving at least one of the drive unit 5 and the brake unit 6 to decelerate the vehicle 2 (S24).

When the travel control unit 11 does not detect the deceleration operation by the vehicle operator (No in S23), the travel control unit 11 determines if the vehicle operator's predetermined touch operation corresponding to the acceleration operation is detected according the signals from the first to third capacitive sensors 35 to 37 (S25). The touch operation by the vehicle operator corresponding to the acceleration operation is an operation different from the steering operation and the deceleration operation, and may be, for example, a single tap operation on the front portion 31A (the first capacitive sensor 35) of the outer ring 33. Upon detecting the acceleration operation by the vehicle operator (Yes in S25), the travel control unit 11 executes the drive control for driving the drive unit 5 to accelerate the vehicle 2 (S26).

When the acceleration control operation by the vehicle operator is not detected (No in S25), the travel control unit 11 determines if a predetermined touch operation by the vehicle operator corresponding to the stop operation is detected according to the signals from the first to third capacitive sensors 35 to 37 (S27). The vehicle operator's touch operation corresponding to the stop operation can be selected in various ways. For example, the touch operation corresponding to the stop operation may be a single tap operation on a predetermined position of the outer peripheral portion 33C (the third capacitive sensor 35) of the outer ring 33. The stop operation by the vehicle operator may be the same as or may be different from the travel start operation. Upon detecting the stop operation by the vehicle operator (Yes in S27), the travel control unit 11 executes the stop control for generating the braking force by the drive unit 5 or the brake unit 6 to stop the vehicle 2 (S28). In the stop control, the travel control unit 11 may operate the parking brake of the brake unit 6 after the vehicle 2 has come to a stop. If the travel control unit 11 does not detect the stop operation by the vehicle operator (No in S27), the travel control unit 11 repeats the second operation control.

When the vehicle 2 is in the autonomous driving mode by the second operation control by the travel control unit 11, the vehicle operator can control the steering, acceleration, and deceleration of the vehicle 2 by touching the steering input member 10. Since the travel control unit 11 executes the steering control, the deceleration control, and the acceleration control in this order of priority, any two of the steering control, the deceleration control, and the acceleration control cannot be executed simultaneously even when the steering operation, the deceleration operation, and the acceleration operation are simultaneously detected. Therefore, even when the vehicle operator's touch operation is not appropriate, the behavior of the vehicle 2 is prevented from becoming unstable.

According to the vehicle control system 1 of the illustrated embodiment, personal differences in the input operation are prevented from causing differences in the behavior of the vehicle. The vehicle operator can accelerate or decelerate the vehicle 2 by touching the first capacitive sensor 35 or the second capacitive sensor 36. The touch operation is unlikely to vary depending on the vehicle operator's physique, age, and the like, so that personal variations in the input operation can be minimized.

The present invention has been described in the terms of a specific embodiment, but is not limited by such an embodiment, and can be modified in various ways without departing from the scope of the present invention. For example, it may be configured such that the slider moving unit 27 can be controlled so as to change the position of the slider relative to the rail 21, and/or to change the extending/contracting (telescopic) position of the arm 23 and the angular position (tilt angle) of the base 24 by the touching operation by the vehicle operator on the first to third capacitive sensors 35 to 37 of the steering input member 10. In other words, it may be configured such that the position of the steering input member 10 may be adjusted by the touch operation by the vehicle operator on the first to third capacitive sensors 35 to 37.

For example, the travel control unit 11 may execute a steering input member adjustment control for adjusting the position of the steering input member 10 upon detecting a signal corresponding to a predetermined adjustment operation according to a signal from the third capacitive sensor 37. The predetermined adjustment operation may be, for example, a long press operation of the third capacitive sensor 37 provided at a suitable position by the vehicle operator. In the steering input member adjustment control, the travel control unit 11 controls the slider moving unit 27 and the arm driving unit 28 according to the signals from the first to third capacitive sensors 35 to 37 so as to control the lateral position, the vertical position, and the fore and aft position of the steering input member 10, and the angular position of the steering input member 10. For example, the vehicle operator is enabled to change the lateral position of the steering input member 10 as described in the following. The travel control unit 11 may control the slider moving unit 27 to start moving the slider 22 leftward upon detecting a touch operation on a part of the third capacitive sensor 37 positioned on the right hand side of the outer ring 33, and to bring the slider moving unit 27 to come to a stop upon detecting a touch operation on another part of the third capacitive sensor 37 positioned on the left hand side of the outer ring 33. The travel control unit 11 can similarly adjust the vertical position of the steering input member 10.

When the steering input member 10 is desired to be adjusted to a position further away from the vehicle operator (contracting operation), the travel control unit 11 controls the arm driving unit 28 to contract the arm 23 upon detecting a touch operation on the first capacitive sensor 35 disposed on the front portion 33A of the outer ring 33, and to stop the arm 23 from contracting upon detecting a touch operation on the second capacitive sensor 36 disposed on the back portion 33B of the outer ring 33. Thereby, the vehicle operator can change the fore and aft position of the steering input member 10 by the touch operation of the steering input member 10.

The travel control unit 11 can also move the steering input member 10 toward the vehicle operator (extending operation) in the same manner.

When the angular position of the base 24 or the tilt angle of the steering input member 10 is desired to be adjusted to a more upright position, the travel control unit 11 controls the arm driving unit 28 so as to cause the base 24 to face more upward upon detecting a touch operation on the first capacitive sensor 35 and a part of the third capacitive sensor 37 positioned in an upper part of the outer ring 33, and stop the arm driving unit 28 upon detecting a drop in the capacitance of the first capacitive sensor 35 (or an end in the touch operation on the first capacitive sensor 35). Thereby, the vehicle operator can change the tilt angle of the steering input member 10 by touching the steering input member 10. The travel control unit 11 can also change the tilt angle of the steering input member 10 downward by performing a similar but reversed operation.

The invention claimed is:

1. A vehicle control system, comprising:
   a steering input member rotatably supported by a vehicle body of a vehicle;
   a primary capacitive sensor provided along an outer edge of the steering input member and configured to detect a position on the steering input member at which a contact is made by a vehicle operator;
   a secondary capacitive sensor provided on the steering input member at a position different from the primary capacitive sensor;
   a rotational angle sensor configured to detect a rotational angle of the steering input member; and
   a control unit configured to control a steering unit of the vehicle according to a signal from the rotational angle sensor and a signal from the primary capacitive sensor;
   wherein the control unit includes a memory and is configured to operate in a first operation mode and a second operation mode, the steering unit being controlled according to the signal from the rotational angle sensor in the first operation mode, and according to the signal from the primary capacitive sensor in the second operation mode, wherein the memory includes programming instructions that, when executed, cause the control unit to:
   in the second operation mode, detect a movement of a contact point on the primary capacitive sensor in a first direction along the outer edge of the steering input member, and a movement of the contact point on the primary capacitive sensor in a second direction opposite from the first direction along the outer edge of the steering input member, and control the steering unit in dependence on the direction of the movement of the contact point on the primary capacitive sensor, and
   in the second operation mode, control the steering unit according to the signal from the primary capacitive sensor, and control a drive unit and/or a brake unit for accelerating and/or decelerating the vehicle according to a signal from the secondary capacitive sensor, wherein the programming instructions, when executed, further cause the control unit to prohibit the control of the drive unit and/or the brake unit according to the signal from the secondary capacitive sensor when the signal from the primary capacitive sensor is changing.

2. The vehicle control system according to claim 1, further comprising an external environment recognition unit configured to acquire environment information of an environment surrounding the vehicle and to output the environment information to the control unit, wherein the programming instructions, when executed, further cause the control unit to change a control mode of the steering unit in the second operation mode according to the acquired environment information.

3. The vehicle control system according to claim 1, wherein the programming instructions, when executed, further cause the control unit to: in the second operation mode, detect the direction of the movement of the contact point on the primary capacitive sensor according to the signal from the primary capacitive sensor, and start controlling the steering unit upon elapsing of a prescribed time period after the contact on the primary capacitive sensor has ceased.

4. The vehicle control system according to claim 1, wherein the primary capacitive sensor is arranged circumferentially along an outer peripheral portion of the steering input member, and the secondary capacitive sensor is provided on a front portion or a back portion of the steering input member.

5. The vehicle control system according to claim 1, further comprising a rotation restricting device configured to selectively restrict a rotation of the steering input member relative to the vehicle body, wherein the programming instructions, when executed, further cause the control unit to activate the rotation restricting device to restrict the rotation of the steering input member relative to the vehicle body in the second operation mode.

6. The vehicle control system according to claim 1, wherein the programming instructions, when executed, further cause the control unit to control the steering unit according to the signals from the primary capacitive sensor and the rotational angle sensor in the second operation mode, and wherein a steering output of the steering unit for a given rotational angle input from the steering input member measured by the rotational angle sensor is smaller in the second operation mode than in the first operation mode.

7. The vehicle control system according to claim 1, wherein the first operation mode is selected when the vehicle is in a manual driving mode, and the second operation mode is selected when the vehicle is in an autonomous driving mode.

* * * * *